(12) United States Patent
Chiu et al.

(10) Patent No.: US 12,299,299 B1
(45) Date of Patent: May 13, 2025

(54) MEMORY SYSTEM

(71) Applicants: INVENTEC (PUDONG) TECHNOLOGY CORPORATION, Shanghai (CN); INVENTEC CORPORATION, Taipei (TW)

(72) Inventors: Kuo-Shu Chiu, Taipei (TW); Liang-Hsi Chien, Taipei (TW); Jhih-Ting Chen, Taipei (TW); Chain Wu Lee, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 18/601,776

(22) Filed: Mar. 11, 2024

(30) Foreign Application Priority Data

Nov. 14, 2023 (CN) .......................... 202311516620.6

(51) Int. Cl.
    *G06F 3/06* (2006.01)
    *G06F 13/42* (2006.01)

(52) U.S. Cl.
    CPC .......... *G06F 3/0626* (2013.01); *G06F 3/0629* (2013.01); *G06F 3/0673* (2013.01); *G06F 13/4221* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 2020/0341930 A1* | 10/2020 | Cannata | G06F 13/4221 |
| 2022/0206937 A1* | 6/2022 | Windh | G06F 12/084 |
| 2024/0231615 A1* | 7/2024 | Choi | G06F 3/0608 |
| 2024/0264965 A1* | 8/2024 | Srivastava | G06F 13/4063 |
| 2024/0296136 A1* | 9/2024 | Muthupandi | G06F 13/4295 |
| 2024/0329854 A1* | 10/2024 | Sharma | G06F 3/0619 |

FOREIGN PATENT DOCUMENTS

CN      116781511 A   *   9/2023

\* cited by examiner

*Primary Examiner* — Kaushikkumar M Patel
(74) *Attorney, Agent, or Firm* — Maschoff Brennan

(57) ABSTRACT

A memory system includes a computing device and a memory device. The memory device includes: first connection ports; a second connection port; a compute express link switch connected to the first connection ports; and a processor connected to the second connection port and the compute express link switch. The processor is configured to obtain a current configuration of the first connection ports from the computing device through the second connection port to update an original configuration stored by the processor, wherein the current configuration indicates an electronic device connected to each of the first connection ports.

7 Claims, 8 Drawing Sheets

MEMORY SYSTEM

CROSS-REFERENCE TO RELATED APPLICATIONS

This non-provisional application claims priority under 35 U.S.C. § 119 (a) on Patent Application No(s). 202311516620.6 filed in China on Nov. 14, 2023, the entire contents of which are hereby incorporated by reference.

BACKGROUND

1. Technical Field

This disclosure relates to a memory system.

2. Related Art

In existing servers, it is common to use various switches to configure the server architecture. However, since these architectures are usually very large, the overall equipment takes up a lot of space and cost, and the transmission efficiency is reduced. Moreover, these architectures are fixed, resulting in limitations in application. In addition, since the server needs to transmit a variety of signals, and some signals need to be transmitted over long distances, it is easy to cause signal loss and may affect the stability of the signal. Take the dual in-line memory module (DIMM) in the server as an example. In order to maintain the reading speed and computing speed required by the processor, the connection between the DIMM and the central processing unit cannot be too far. Therefore, direct memory access (DMA) was developed. Taking DIMM in current servers as an example, a central processing unit is equipped with roughly 12 DIMMs. However, when the server is actually running, the utilization rate of the DIMMs is approximately less than 80%.

SUMMARY

Accordingly, this disclosure provides a memory system.

According to one or more embodiment of this disclosure, a memory system includes a computing device and a memory device. The memory device includes: a plurality of first connection ports; a second connection port; a compute express link switch connected to the plurality of first connection ports; and a processor connected to the second connection port and the compute express link switch. The processor is configured to obtain a current configuration of the plurality of first connection ports from the computing device through the second connection port to update an original configuration stored by the processor, wherein the current configuration indicates an electronic device connected to each of the plurality of first connection ports.

In view of the above description, according to the memory system including the memory device and the computing device of one or more embodiments of the present disclosure, the computing device and the processor may determine the latest configuration of the memory device, thereby avoiding problems caused by the computing device and the processor not updating the configurations.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
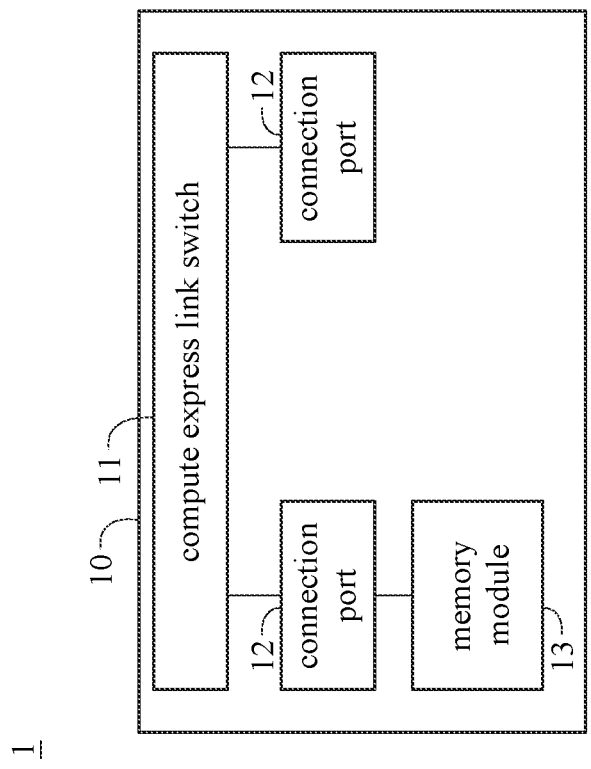
FIG. 1 is a block diagram illustrating a memory device according to an embodiment of the present disclosure.

Please refer to FIG. 1, wherein FIG. 1 is a block diagram illustrating a memory device according to an embodiment of the present disclosure. As shown in FIG. 1, the memory device 1 includes a chassis 10, a compute express link (CXL) switch 11, a plurality of connection ports 12 and a memory module 13.

The CXL switch 11, the connection ports 12 and the memory module 13 are disposed within the chassis 10. Moreover, the CXL switch 11, the connection ports 12 and the memory module 13 may be disposed on the same substrate, and this substrate is disposed within the chassis 10. The CXL switch 11 may be an open compute express link switch. Each of the connection ports 12 may be a peripheral component interconnect express (PCIe) slot, and may be a pluggable connection port.

The memory module 13 may be a dual in-line memory module (DIMM). The memory module 13 is connected to the CXL switch 11 through one of the connection ports 12. In other words, the number of the connection ports 12 may be the same or higher than the number of the memory module 13. By commonly disposing the CXL switch 11 and the memory module 13 within the chassis 10, the transmission efficiency may be improved, and the space and cost occupied by the overall equipment may be reduced.

It should be noted that FIG. 1 exemplarily illustrates two connection ports 12 and one memory module 13, but the memory device 1 may also have, for example, 16 connection ports 12 with 8 memory modules 13. The present disclosure does not limit the number of the connection ports 12 and the number of the memory module 13.

Figure 2:
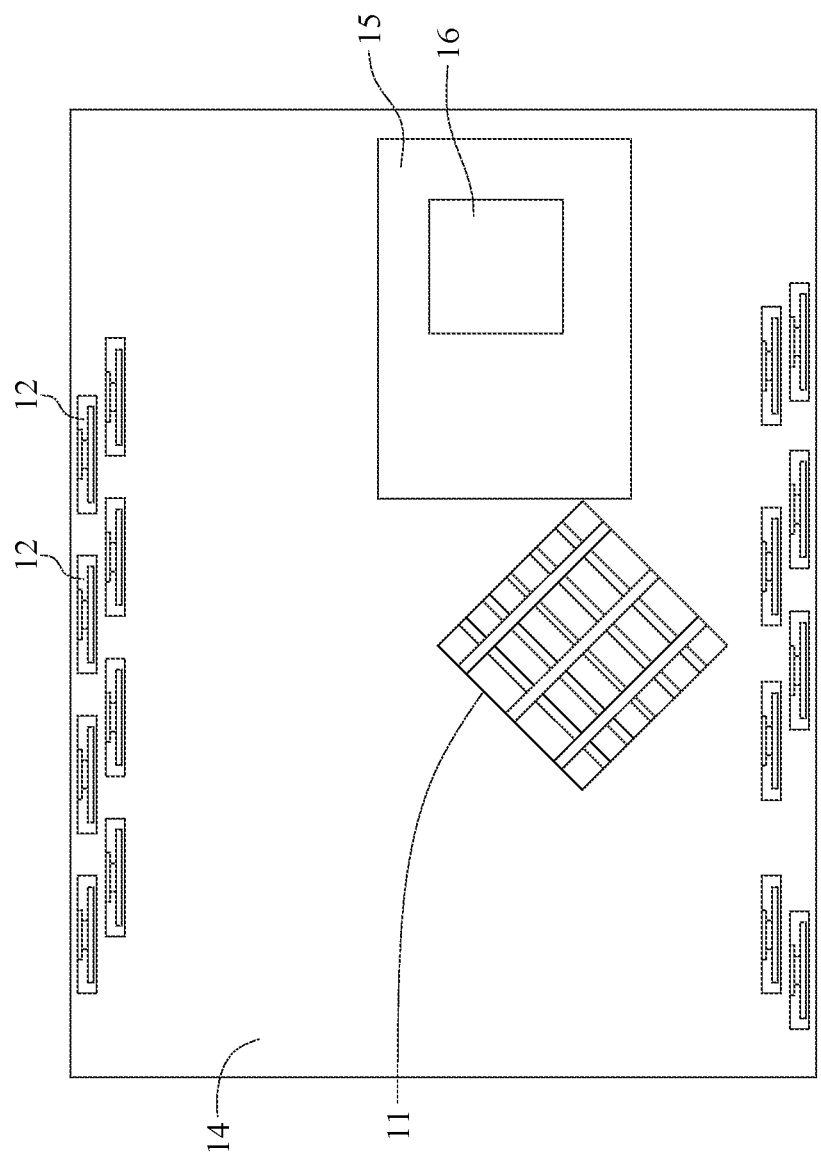
FIG. 2 is a block diagram illustrating a compute express link switch and a plurality of connection ports according to an embodiment of the present disclosure.
Figure 3:
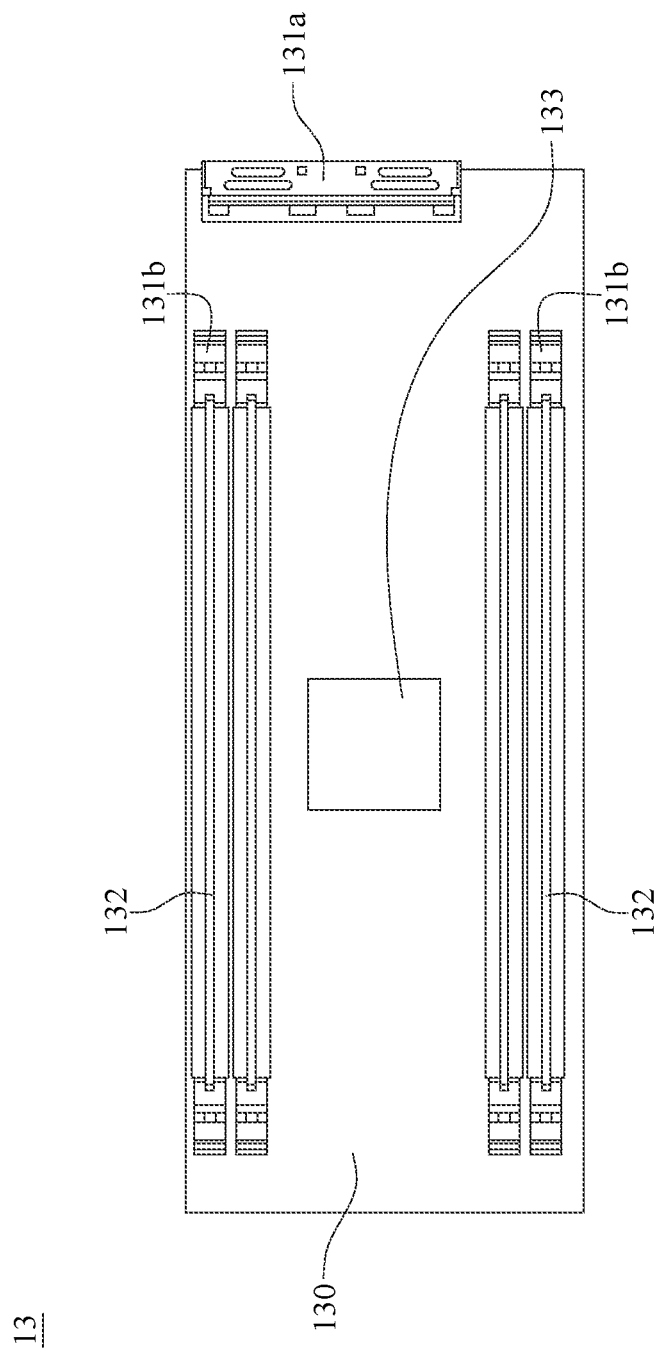
FIG. 3 is a schematic diagram illustrating a memory module according to an embodiment of the present disclosure.

Please refer to FIG. 1 and FIG. 2, wherein FIG. 2 is a block diagram illustrating a compute express link switch and a plurality of connection ports according to an embodiment of the present disclosure. As shown in FIG. 2, the memory device 1 may further include a substrate 14, and the CXL switch 11 and the connection ports 12 are disposed on the substrate 14. Further, the memory device 1 may further include another substrate 15 disposed on the substrate 14 and a central processing unit 16 disposed on the substrate 15. Please refer to FIG. 1 and FIG. 3, wherein FIG. 3 is a schematic diagram illustrating a memory module according to an embodiment of the present disclosure. The memory module shown in FIG. 3 may be the memory module 13 of FIG. 1. As shown in FIG. 3, the memory module 13 includes a substrate 130, a first sub-connection port 131a, a plurality of second sub-connection ports 131b, a plurality of memories 132 and a chip 133. The first sub-connection port 131a and the second sub-connection ports 131b are located on the substrate 130. The first sub-connection port 131a may be connected to the CXL switch 11. The first sub-connection port 131a may be a PCIe connection port. The memories 132 may be dual in-line memory modules (DIMM).

The chip 133 may be a control chip on the DIMM. The chip 133 is connected to the second sub-connection ports 131b and is configured to convert signal format. Moreover, the chip 133 may convert a PCIe-based format of a signal coming from the CXL switch 11 into a format that is accessible by the memories 132, or convert signals coming from the memories 132 into the PCIe-based format.

Figure 4:
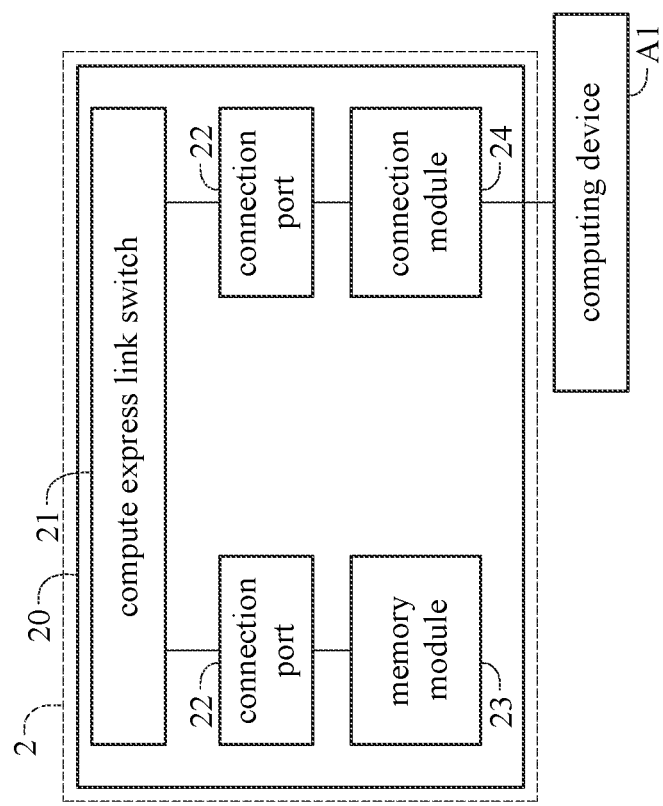
FIG. 4 is a block diagram illustrating a memory device according to another embodiment of the present disclosure.

Please refer to FIG. 4, wherein FIG. 4 is a block diagram illustrating a memory device according to another embodiment of the present disclosure. As shown in FIG. 4, the memory device 2 includes a chassis 20, a CXL switch 21, a plurality of the connection ports 22, a memory module 23 and a connection module 24.

The CXL switch 21, the connection ports 22, the memory module 23 and the connection module 24 are disposed within the chassis 20. Moreover, the CXL switch 21, the connection ports 22, the memory module 23 and the connection module 24 may be disposed on the same substrate, and this substrate is disposed within the chassis 20. The implementations of the chassis 20, the CXL switch 21, the connection ports 22 and the memory module 23 of the memory device 2 may be the same as the chassis 10, the CXL switch 11, the connection ports 12 and the memory module 13 of the memory device 1 shown in FIG. 1, respectively, and their details are not repeated herein.

The memory module 23 is connected to the CXL switch 21 through one of the connection ports 22, and the connection module 24 is connected to the CXL switch 21 through another one of the connection ports 22. Specifically, as described above, the connection ports 22 may be pluggable connection ports. Therefore, each of the connection ports 22 in the memory device 2 may be configured to be plugged with the memory module 23 or the connection module 24. In addition, as shown in FIG. 4, the connection module 24 may be configured to connect the computing device A1, and the memory module 23 may be connected to the computing device A1 through the CXL switch 21 and the connection module 24. For example, the computing device A1 may be a server, and the connection module 24 may be implemented by a port card provided with the connection ports for the server.

The number of the memory module 23 and the number of the connection module 24 shown in FIG. 4 are only examples, the ratio between the number of the memory module 23 and the number of the connection module 24 is adjustable. Through the structure of FIG. 4, a composable memory device may be realized. Therefore, the numbers of and/or locations of the memory module and the connection module in the memory device may be adjusted to allow the memory device to be further connected to other devices, thereby expanding the memory structure.

Figure 5:
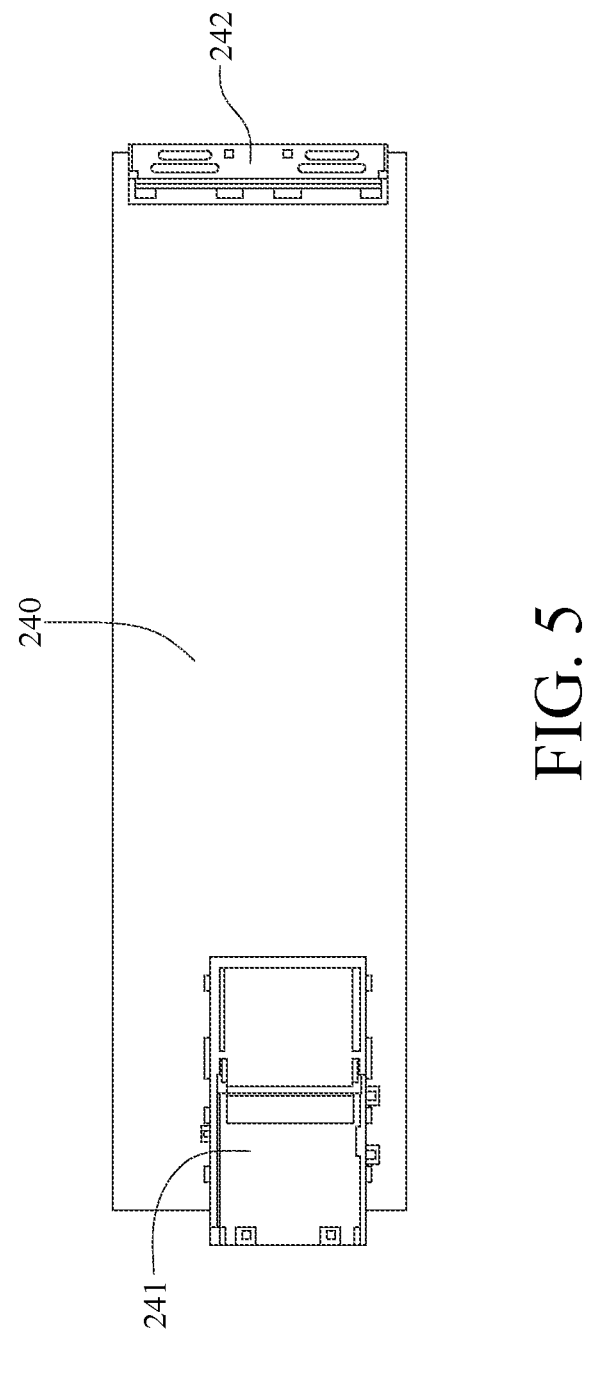
FIG. 5 is a schematic diagram illustrating a memory module according to an embodiment of the present disclosure.

Please refer to FIG. 4 and FIG. 5, wherein FIG. 5 is a schematic diagram illustrating a memory module according to an embodiment of the present disclosure. The connection module shown in FIG. 5 may be the connection module 24 shown in FIG. 4. As shown in FIG. 5, the connection module 24 includes a substrate 240, a first connector 241 and a second connector 242. The first connector 241 and the second connector 242 are disposed on the substrate 240. The first connector 241 may include, for example, a CDFP connector. The second connector 242 may be a PCIe connector. The second connector 242 is configured for the connection module 24 to be connected to the connection port 22.

The first connector 241 may be configured to connect the server. The first connector 241 may be configured to receive a platform reset signal generated by the server, and further configured to transmit the platform reset signal to the connection port 22 of the memory device 2 through the second connector 242. The server and the memory system 100 are electrically connected to each other through the CDFP connector.

Figure 6:
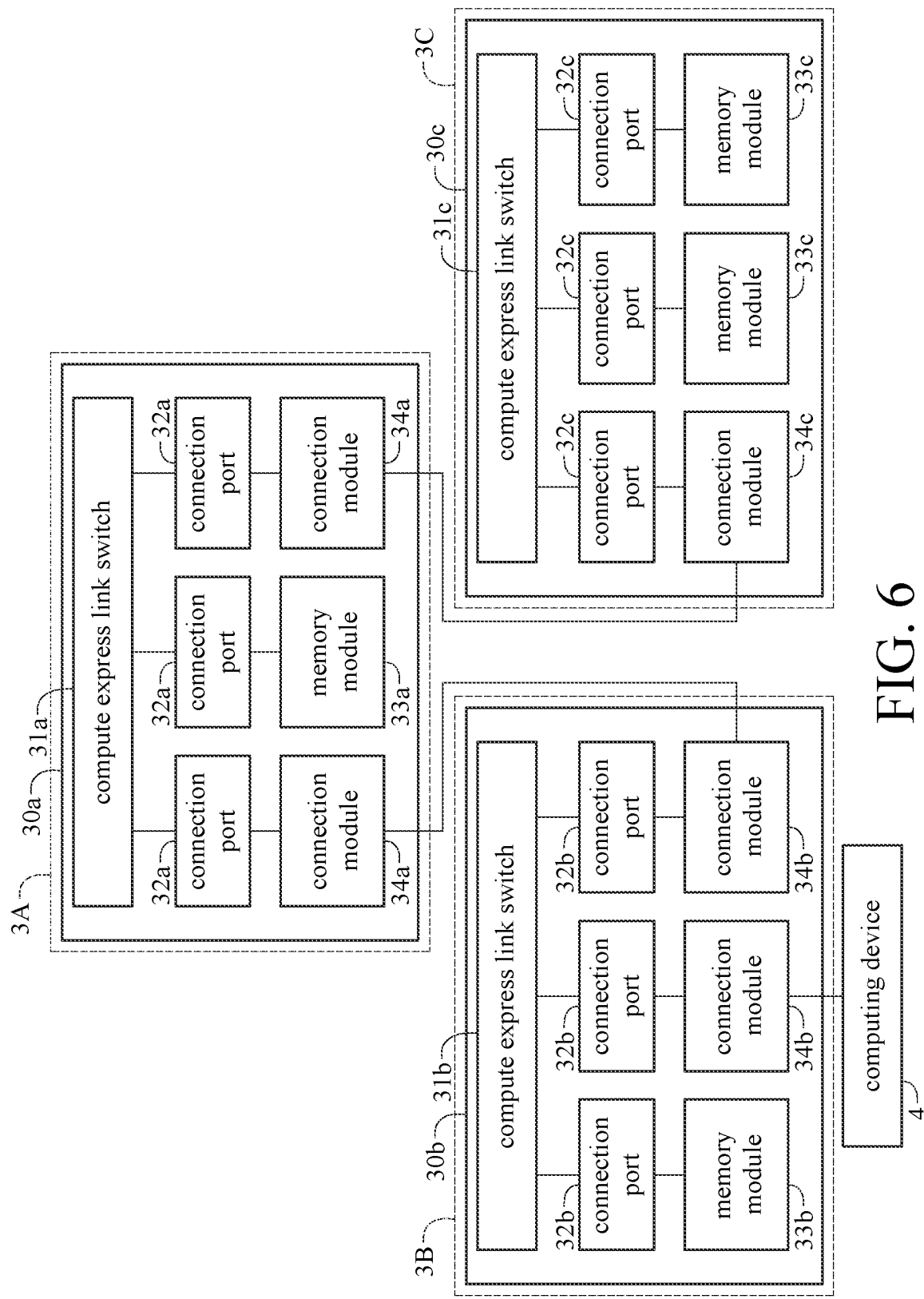
FIG. 6 is a block diagram illustrating a memory system according to an embodiment of the present disclosure.

Please refer to FIG. 6, wherein FIG. 6 is a block diagram illustrating a memory system according to an embodiment of the present disclosure. As shown in FIG. 6, the memory system 100 includes a plurality of memory devices 3A, 3B and 3C.

The memory device 3A includes a chassis 30a, a CXL switch 31a, connection ports 32a, a memory module 33a and connection modules 34a; the memory device 3B includes a chassis 30b, a CXL switch 31b, connection ports 32b, a memory module 33b and connection modules 34b; and the memory device 3C includes a chassis 30c, a CXL switch 31c, connection ports 32c, memory modules 33c and a connection module 34c. The implementation of each of the memory devices 3A, 3B and 3C may be the same as the memory device of one or more embodiments described with reference to FIG. 1 to FIG. 5, and the details of the memory devices 3A, 3B and 3C are not repeated herein.

The memory module of each of the memory devices 3A, 3B and 3C is connected to the CXL switch through one of the connection ports, and the connection module of each of the memory devices 3A, 3B and 3C is connected to the CXL switch through another one of the connection ports; and the connection module of one of the memory devices 3A, 3B and 3C is connected to the connection module of another one of the memory devices 3A, 3B and 3C.

Take the memory device 3A as an example, the memory module 33a of the memory device 3A is connected to the CXL switch 31a through one of the connection ports 32a, and the connection module 34a of the memory device 3A is connected to the CXL switch 31a through another one of the connection ports 32a. Further, one connection module 34a of the memory device 3A is connected to the connection module 34b of the memory device 3B. In addition, another connection module 34a of the memory device 3A may be connected to the connection module 34c of the memory device 3C.

Each of the memory devices 3A, 3B and 3C may include one or more memory modules and at least one connection module. In other words, the memory module of each of the memory devices 3A, 3B and 3C may be replaced with the connection module, and the connection module of each of the memory devices 3A, 3B and 3C may also be replaced with the memory module. The connection relationship shown in FIG. 6 is merely an example, and the numbers of the memory devices as well as the numbers of the connection modules and memory modules shown in FIG. 6 are merely examples.

Further, as shown in FIG. 6, the memory system 100 may further include a computing device 4, wherein the computing device 4 may be a server. The computing device 4 is optionally disposed. The computing device 4 is connected to the connection module of at least one of the memory devices 3A, 3B and 3C. For example, as shown in FIG. 6, the computing device 4 may be connected to the connection module 34b of the memory device 3B. According to FIG. 6, each of the memory devices 3A, 3B and 3C may include two connection modules, wherein one connection module is configured to connect another memory device, and another connection module is configured to connect other device(s), such as the computing device A1.

The memory system according to one or more embodiments of the present disclosure may expand the memory pool according to actual requirements, thereby having more flexibility in application.

Figure 7:
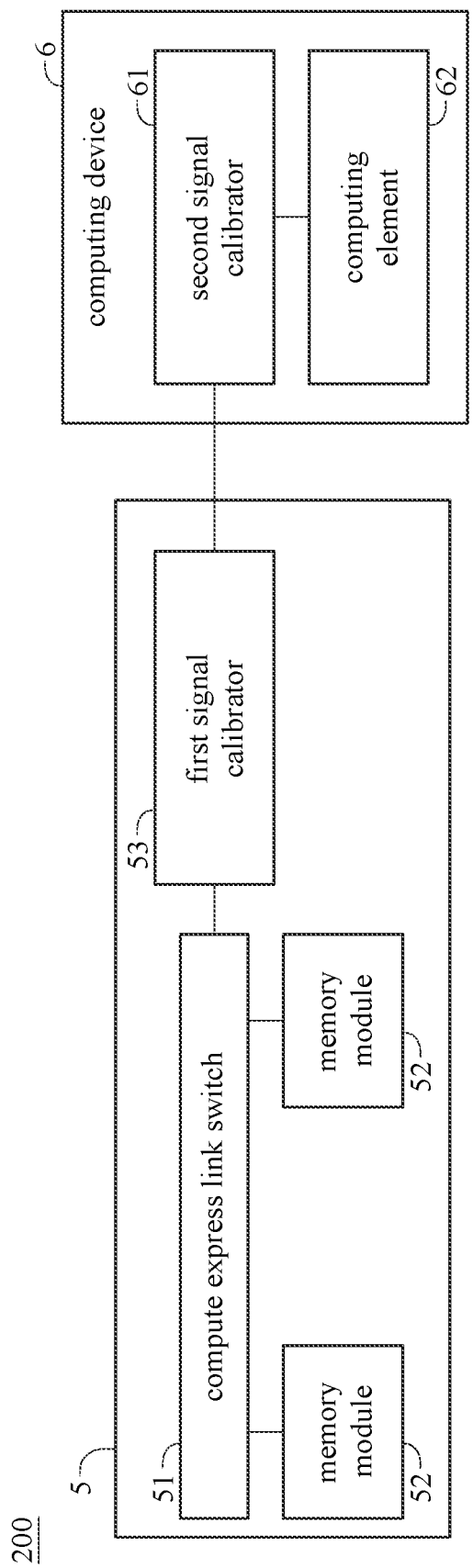
FIG. 7 is a block diagram illustrating a memory system according to another embodiment of the present disclosure.

Please refer to FIG. 7, wherein FIG. 7 is a block diagram illustrating a memory system according to another embodiment of the present disclosure. As shown in FIG. 7, the memory system 200 includes a memory device 5 and a computing device 6.

The memory device 5 includes a CXL switch 51, a plurality of memory modules 52 and a first signal calibrator 53. The implementations of the CXL switch 51 and the memory modules 52 may be the same as the CXL switch and the memory modules of one or more embodiments described with reference to FIG. 1 to FIG. 6, and the memory modules 52 may be connected to the CXL switch 51 through the connection ports as described in one or more embodiments with reference to FIG. 1 to FIG. 6. Moreover, the memory device 5 may be connected to the computing device 6 through the connection port and the connection module of one or more embodiments described with reference to FIG. 4 and FIG. 5. Further, the first signal calibrator 53 may be disposed between the CXL switch and the connection port, or may be disposed at the connection module.

The computing device 6 includes a second signal calibrator 61 and a computing element 62. The second signal calibrator 61 is connected to the first signal calibrator 53 and the computing element 62. The computing device 6 may be a server. The computing element 62 is, for example, a central processing unit, a graphics processing unit (GPU), etc.

The first signal calibrator 53 and the second signal calibrator 61 may be configured to calibrate at least one of an error and a loss of an initial signal generated by the memory module 52. The computing element 62 of the computing device 6 may receive the signal generated by one of the first signal calibrator 53 and the second signal calibrator 61.

In an implementation, the first signal calibrator 53 and the second signal calibrator 61 may each be a redriver. The first signal calibrator 53 is configured to calibrate the loss of the initial signal output by the CXL switch 51 to output a first calibrated signal to the second signal calibrator 61, and the second signal calibrator 61 is configured to calibrate the loss of the first calibrated signal to output a second calibrated signal to the computing element 62. In other words, the first signal calibrator 53 may amplify the initial signal to generate the first calibrated signal, and the second signal calibrator 61 may amplify the first calibrated signal to generate the second calibrated signal.

In another implementation, the first signal calibrator 53 is a retimer, and the second signal calibrator 61 is a redriver. The first signal calibrator 53 is configured to calibrate the error of the initial signal to output the first calibrated signal to the second signal calibrator 61, and the second signal calibrator 61 is configured to calibrate the loss of the first calibrated signal to output the second calibrated signal to the computing element 62. In other words, the first signal calibrator 53 may repair a flick of the initial signal to generate the first calibrated signal, and the second signal calibrator 61 may amplify the first calibrated signal to generate the second calibrated signal.

In yet another implementation, the first signal calibrator 53 is a redriver, and the second signal calibrator 61 is a retimer. The first signal calibrator 53 is configured to calibrate the loss of the initial signal to output the first calibrated signal to the second signal calibrator 61, and the second signal calibrator 61 is configured to calibrate the loss of the first calibrated signal to output the second calibrated signal to the computing element 62. In other words, the first signal calibrator 53 may amplify the initial signal to generate the first calibrated signal, and the second signal calibrator 61 may repair a flick of the first calibrated signal to generate the second calibrated signal.

Through the memory system according to one or more embodiments designed above, by implementing a signal calibrator with a redriver, the signal may be transmitted over longer distance. Further, by implementing a signal calibrator with a retimer, a clean and stable signal may be generated.

Figure 8:
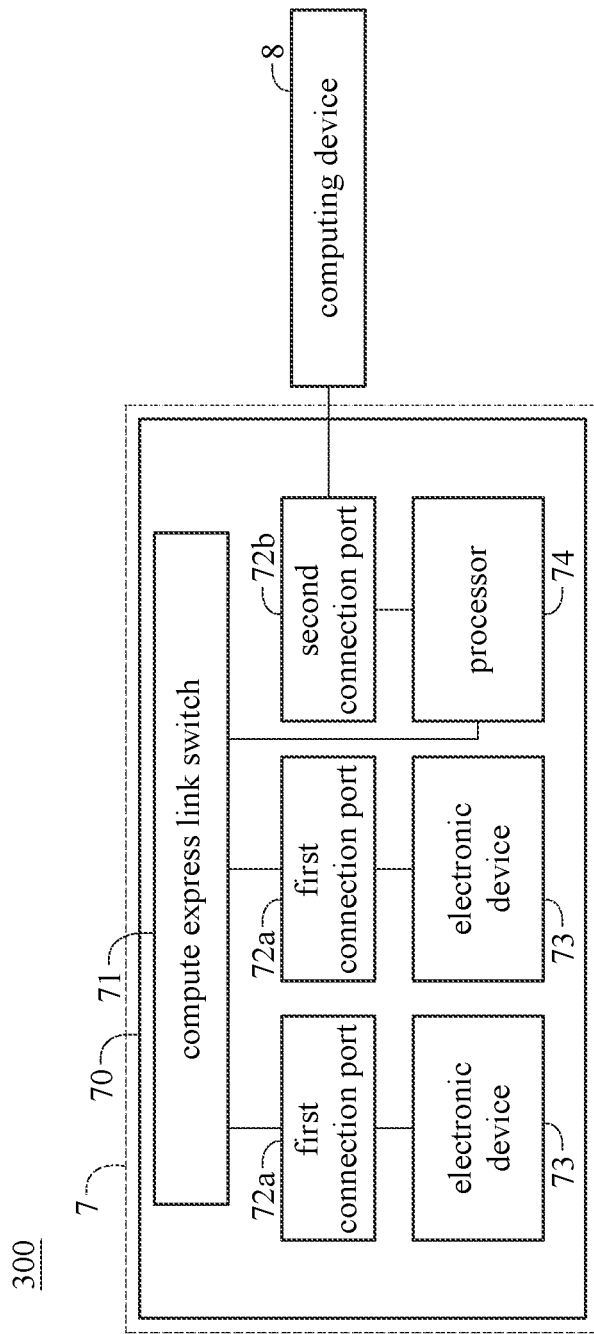
FIG. 8 is a block diagram illustrating a memory system according to still another embodiment of the present disclosure.

Please refer to FIG. 8, wherein FIG. 8 is a block diagram illustrating a memory system according to still another embodiment of the present disclosure. As shown in FIG. 8, the memory system 300 includes a memory device 7 and a computing device 8.

The memory device 7 includes a CXL switch 71, a plurality of first connection ports 72a and a second connection port 72b. The CXL switch 71 may be an open CXL switch. The first connection ports 72a and the second connection port 72b may each be a PCIe slot, and maybe pluggable connection ports. The processor 74 may be a central processing unit, such as the central processing unit 16 shown in FIG. 2. The computing device 8 may be a server.

Each of the first connection ports 72a is connected to an electronic device 73. For example, the first connection ports 72a may be the connection ports described in one or more embodiments with reference to FIG. 1 to FIG. 6, and the electronic device 73 may be the memory module or the connection module as described in one or more embodiments with reference to FIG. 1 to FIG. 7.

The processor 74 is connected to the second connection port 72b and the CXL switch 71, and the second connection port 72b is further connected to the computing device 8, wherein the second connection port 72b may be connected to the computing device 8 in a wired or wireless way. The processor 74 is configured to obtain a current configuration of the first connection ports 72a from the computing device 8 through the second connection port 72b to update an original configuration stored by the processor 74. The current configuration indicates the electronic device 73 connected to which each of the first connection ports 72a is connected. The current configuration may be implemented by PCIe enumeration.

Also, the memory device 7 may further include a chassis 70, and the CXL switch 71, the first connection ports 72a, the second connection port 72b, the electronic device 73 and the processor 74 are disposed within the chassis 70. Specifically, as described above, the electronic device 73 may be the memory module and the connection module, and the memory module and the connection module may each be disposed with a control chip. The computing device 8 may obtain the current configuration of the first connection ports 72a by reading the control chip.

The computing device 8 may transmit a reset signal to the processor 74 through the second connection port 72b, and the processor 74 is further configured to control the CXL switch 71 to connect the first connection ports 72a to the computing device 8 according to the reset signal to generate the current configuration of the first connection ports 72a. The current configuration may be generated by the computing device 8 scanning the first connection ports 72a through the CXL switch 71, respectively. The reset signal may be a platform reset signal.

Specifically, after the computing device 8 transmitting the reset signal to the processor 74, the processor 74 may first connect one of the first connection ports 72a to the computing device 8, and the computing device 8 reads configuration data of said one of the first connection ports 72a. Then, the processor 74 may connect another one of the first connection ports 72a to the computing device 8, and the computing device 8 reads configuration data of said another one of the first connection ports 72a. Accordingly, the computing device 8 may use the read configuration data as the current configuration. The configuration data may indicate one or more of a serial number of the first connection port 72a, a name of the first connection port 72a, a brand of the first connection port 72a, a serial number of the electronic device 73 connected to the first connection port 72a, a name of the electronic device 73 and a brand of the electronic device 73.

In addition, the computing device 8 may also set the current configuration according to user command. For example, the user command may indicate one or more of a serial number, a name and a brand of each of the first connection ports 72a. The user command may further indicate one or more of a serial number, a name and a brand of the electronic devices 73 connected to the first connection ports 72a, respectively. The computing device 8 may use the configuration data indicated by the user command as the current configuration.

After obtaining the current configuration, the computing device 8 may output the current configuration to the processor 74, thereby updating the original configuration stored by the processor 74. The computing device 8 may include a basic input/output system (BIOS), and the BIOS may be configured to generate the reset signal described above.

According to the memory system of one or more embodiments of the present disclosure, the computing device and the processor may determine the latest configuration of the memory device, thereby avoiding problems caused by the computing device and the processor not updating the configurations.

In the present embodiments, the server of the present application may be applied to artificial intelligence (AI) computing, edge computing, and the server may served as a 5G server, a cloud server or a vehicle-to-everything (V2X) server.

In view of the above, by commonly disposing a compute express link switch, a plurality of connection ports and a plurality of memory modules within the chassis, the transmission efficiency of the memory device according to one or more embodiments of the present disclosure may be improved, and the space and cost occupied by the overall equipment may be reduced. According to one or more embodiments of the present disclosure the memory device, the numbers of and/or locations of the memory module and the connection module in the memory device may be adjusted to allow the memory device to be further connected to other devices, thereby expanding the memory structure. The memory system including memory devices according to one or more embodiments of the present disclosure may expand the memory pool according to actual requirements, thereby having more flexibility in application. The memory system including signal calibrators according to one or more embodiments of the present disclosure may allow the computing device to obtain signal(s) with better quality. Further, by implementing a signal calibrator with a redriver, the signal may be transmitted over longer distance; and by implementing a signal calibrator with a retimer, a clean and stable signal may be generated. According to the memory system including the memory device and the computing device of one or more embodiments of the present disclosure, the computing device and the processor may determine the latest configuration of the memory device, thereby avoiding problems caused by the computing device and the processor not updating the configurations.

What is claimed is:

1. A memory system, comprising:
   a computing device; and
   a memory device, comprising:
      a plurality of first connection ports;
      a second connection port;
      a compute express link switch connected to the plurality of first connection ports; and
      a processor connected to the second connection port and the compute express link switch, and configured to obtain a current configuration of the plurality of first connection ports from the computing device through the second connection port to update an original configuration stored by the processor, wherein the current configuration indicates an electronic device to which each of the plurality of first connection ports is connected.

2. The memory system according to claim 1, wherein the computing device is configured to transmit a rest signal to the processor through the second connection port, and the processor is further configured to control the compute express link switch to connect the plurality of first connection ports and the computing device, respectively, to generate the current configuration of the plurality of first connection ports.

3. The memory system according to claim 2, wherein the computing device scans the plurality of first connection ports through the compute express link switch to generate the current configuration.

4. The memory system according to claim 2, wherein the computing device comprises a basic input/output system, and the basic input/output system is configured to generate the reset signal.

5. The memory system according to claim 1, wherein the computing device is configured to set the current configuration according to a user command.

6. The memory system according to claim 1, wherein the plurality of first connection ports are pluggable connection ports.

7. The memory system according to claim 1, wherein the current configuration is implemented by peripheral component interconnect express enumeration.

\* \* \* \* \*